United States Patent
Mere et al.

(10) Patent No.: US 10,387,141 B2
(45) Date of Patent: Aug. 20, 2019

(54) UPGRADABLE FIRMWARE SYSTEM

(71) Applicants: Shadi Mere, Ann Arbor, MI (US); Theodore Charles Wingrove, Plymouth, MI (US); Michael Eichbrecht, Farmington Hills, MI (US); Kyle Entsminger, Canton, MI (US)

(72) Inventors: Shadi Mere, Ann Arbor, MI (US); Theodore Charles Wingrove, Plymouth, MI (US); Michael Eichbrecht, Farmington Hills, MI (US); Kyle Entsminger, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/958,407

(22) Filed: Dec. 3, 2015

(65) Prior Publication Data

US 2016/0188315 A1   Jun. 30, 2016

Related U.S. Application Data

(60) Provisional application No. 62/098,073, filed on Dec. 30, 2014.

(51) Int. Cl.
*G06F 9/44* (2018.01)
*G06F 8/654* (2018.01)

(52) U.S. Cl.
CPC .................................. *G06F 8/654* (2018.02)

(58) Field of Classification Search
None
See application file for complete search history.

(56) References Cited

U.S. PATENT DOCUMENTS

| | | | |
|---|---|---|---|
| 2014/0068596 A1 | 3/2014 | Mota | |
| 2014/0070932 A1* | 3/2014 | Prasad | B60Q 1/00 340/438 |
| 2014/0196024 A1* | 7/2014 | Hanon | G06F 8/665 717/178 |
| 2016/0098266 A1* | 4/2016 | Martin | G06F 8/665 717/171 |

* cited by examiner

*Primary Examiner* — Qamrun Nahar
(74) *Attorney, Agent, or Firm* — Dickinson Wright PLLC

(57) ABSTRACT

The aspects of the present disclosure provide an upgradable firmware system and a method of adjusting or upgrading firmware through an upgradable firmware system within a vehicle cockpit. The upgradable firmware system may include a plug & play interface designed to interface with the vehicle cockpit. The plug & play interface may be configured to receive a plug & play card with a set of instructions for performing a task such as, updating one or more hardware and firmware blocks. The plug & play interface may be configured to recognize the plug & play card and adjust one or more hardware and firmware vehicle cockpit blocks based on the hardware and firmware block's configuration.

17 Claims, 7 Drawing Sheets

UPGRADABLE FIRMWARE SYSTEM

CROSS-REFERENCE TO RELATED APPLICATION

This patent application claims priority to U.S. Provisional Application No. 62/098,073, filed Dec. 30, 2014, entitled "UPGRADABLE FIRMWARE SYSTEM," now pending. This patent application contains the entirety of U.S. Provisional Patent application No. 62/098,073.

BACKGROUND

Upgrades to vehicle hardware and firmware blocks are currently performed manually. Systems that facilitate the upgrade notify the user of a new device and then have the user search for and upload the corresponding software for that device. However, these devices are exceedingly difficult for the user to install as the device's docking station is located within vehicle cockpit area out of the user's reach. As a result, the device involves dealer installation to upgrade hardware and firmware blocks.

Once installed, the device updates hardware and firmware blocks the vehicle supports. But the device does not alert or notify the user of which applications and blocks were affected or changed during the update. The device further does not alert or notify the user of available applications that may be purchased or downloaded, and are relevant to the updated blocks.

Thus, an upgradable firmware system that is easy for a user to install, does not require dealer installation, and updates hardware and firmware blocks quickly is desired. An upgradable firmware system that notifies the user of the applications and blocks affected by the updates, and notifies or alerts the user of available relevant applications for download or purchase is also desired.

SUMMARY

A system for upgrading firmware of a vehicle is described herein. The system includes an electronic port configured to receive an electronic portable media, the electronic portable media configured to provide instructions of an upgradeable portion of a vehicle; a plug and play interface configured to electronically communicate the instructions to instructions to a vehicle cockpit block, wherein in response to the electronic portable media being inserted into the electronic port and a new component of the vehicle is installed, an action associated with the upgrading of the firmware is performed, In another example, the action is defined as automatically recognizing the new component, and adjusting the firmware of the vehicle with a predefined set of applications for the new component.

In another example, the action is defined as transmitting a message prompting a selection of whether to install the new component.

In another example, the action is defined as transmitting a message prompting a selection of whether to install a predefined set of applications associated with the new component.

In another example, the predefined set of applications are sourced from a network connected source.

In another example, the electronic port is situated in the vehicle's dashboard area.

Also described herein is an electronic card. The electronic card includes an interface electronic component configured to transmit instructions electronically to an electronic port of a vehicle; and non-volatile memory configured to store the instructions to be transmitted, wherein the instructions including actions to upgrade the vehicle's firmware in response to a new component being installed on the vehicle.

In another example of the electronic card, the action is defined as automatically recognizing the new component, and adjusting the firmware of the vehicle with a predefined set of applications for the new component.

In another example of the electronic card, the action is defined as transmitting a message prompting a selection of whether to install the new component.

In another example of the electronic card, the action is defined as transmitting a message prompting a selection of whether to install a predefined set of applications associated with the new component.

In another example of the electronic card, the predefined set of applications are sourced from a network connected source.

In another example, the electronic card is inserted by an occupant of the vehicle.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DRAWINGS

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

The aspects of the present disclosure provide an upgradable firmware system and method of adjusting upgrading firmware of a vehicle cockpit with an upgradable firmware system. The upgradable firmware system may be configured to interface with a vehicle cockpit block and upgrade or adjust the vehicle cockpit block's hardware/firmware blocks based on the hardware and firmware blocks configuration. The upgradable firmware system is backwards compatible and may upgrade firmware based on the hardware/firmware's configuration. The upgradable firmware system may also be configured to notify the user of the hardware/firmware blocks affected by the upgrade and to notify the user of applications compatible with the upgraded hardware blocks for download and purchase. Additionally, the upgradable firmware system may allow an individual to upgrade or adjust the vehicle cockpit's hardware/firmware blocks.

The upgradable firmware system may further be configured to interface with one or more vehicle cockpit blocks, such as an electronic control unit and a display. The upgradable firmware system may transmit a set of instruction to the vehicle's electronic control unit to display the applications and blocks that are prepared to be adjusted or upgraded on the vehicle's display. The upgradable firmware system may include a plug & play interface and a plug & play card to facilitate upgrading hardware and firmware.

The upgradable firmware system may have various advantages over previous systems. First, unlike previous systems, the upgradable firmware system facilitates user installation of upgrades or updates to hardware and firmware blocks. Second, the upgradable firmware system shows the user which blocks and application are ready for updates. Third, the upgradable firmware system notifies the user of available relevant applications for download or purchase.

Figure 1:
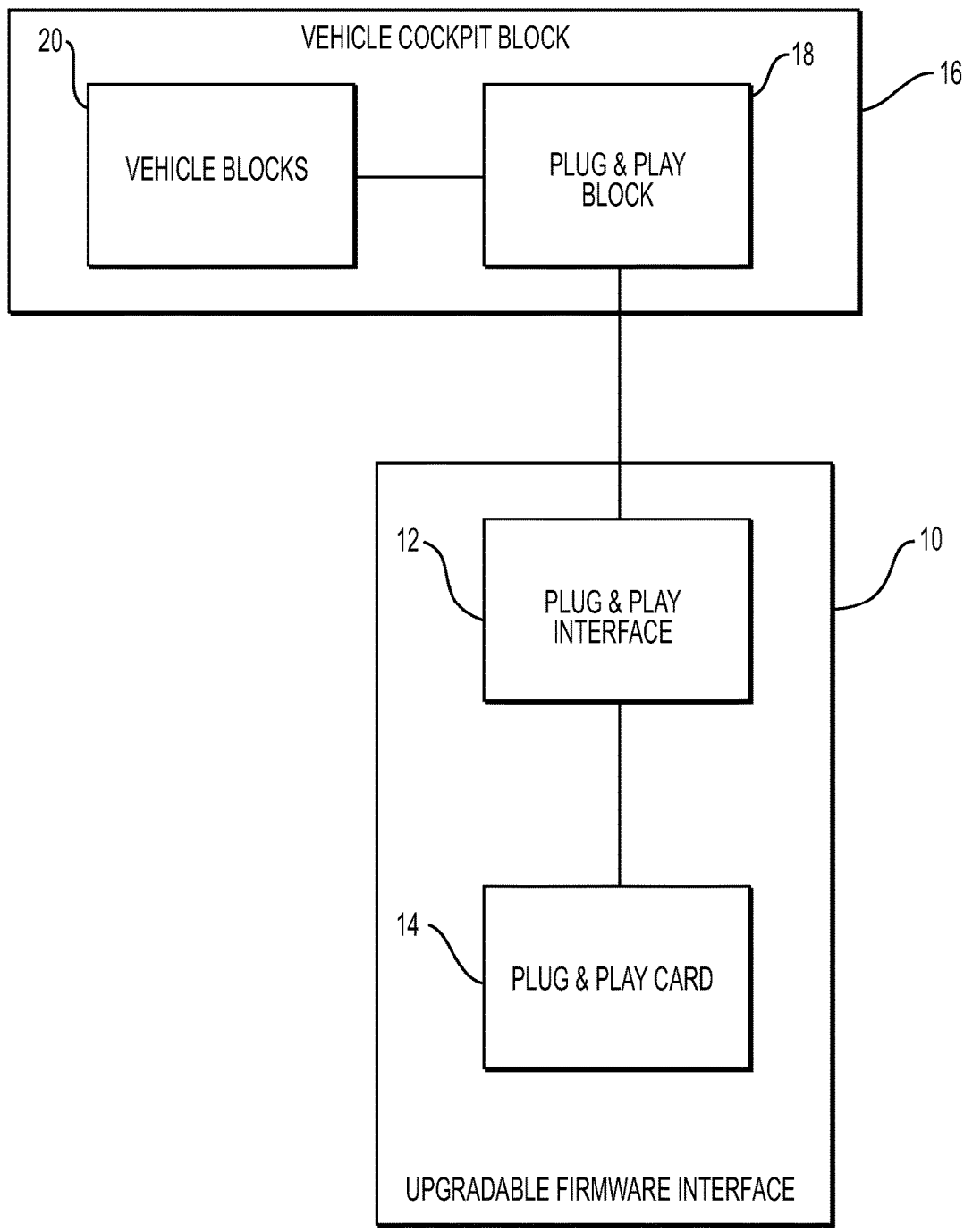
FIG. 1 is a block diagram of an upgradable firmware system in accordance with an aspect of the present disclosure.

FIG. 1 is a block diagram of an upgradable firmware system 10 in accordance with an aspect of the present disclosure. The upgradable firmware system 10 may include a plug & play interface 12 and a plug & play card 14. The plug & play interface 12 may be a port or a docking station. The plug & play card 14 may store a non-volatile memory configured to perform a task such as, updating one or more hardware and firmware blocks. The plug & play card 14 may be inserted into the plug & play interface 12 to update vehicle hardware and firmware. The upgradable firmware system 10 may be designed to interface with the vehicle cockpit block 16 through a plug & play block 18, and in turn vehicle blocks 20 may be an electronic control unit, a display, or the like. Specifically, the plug & play interface 12 connects to the plug & play block 18. The plug & play block 18 may be connected to vehicle hardware components and to the vehicle's processor or electronic control unit. The plug & play interface 12 may employ connectors to interface with the plug & play block 18's connectors. The plug & play interface 12 may further be in electrical communication with the plug & play block 18 for transmitting commands and instructions there between. The plug & play interface 12 may employ firmware over-the-air capabilities to wirelessly transmit commands and instructions to the plug & play block 18 to adjust the vehicle's hardware and firmware.

The plug & play interface 12 may be configured to receive the plug & play card 14. The plug & play interface 12 may include a slot (not shown) that receives the plug & play card 14. The slot may have any shape conducive for receiving the plug & play card 14. The plug & play card 14 may be a card, a USB device, or a chip. The plug & play card 14 may alternatively be any device designed to store a non-volatile memory configured to perform a task such as, updating one or more hardware and firmware blocks. The plug & play card 14 may be any shape or size that is conducive to storing the non-volatile memory and conducive for inserting the plug & play card 14 into the plug & play interface 12 slot. The plug & play card 14 may be a memory expansion card, a connectivity card, a graphics card, or any type of card that improves the operation or enhances the functionality of the vehicle cockpit block 16. The plug & play card 14 may also include a set of instruction for performing a task such as, upgrading one or more hardware and firmware blocks within the vehicle cockpit.

The plug & play interface 12 may also be configured to upload or transmit the set of instruction for performing a task to the plug & play block 18. The set of instruction may include instructions for displaying a message indicating the plug & play interface 12 recognizes one or more hardware modules that are prepared to upgraded or updated. The set of instructions may also include instructions for notifying the user as to which applications or firmware may be adjusted to be compatible with the upgraded hardware blocks. The set of instructions may also include instructions for upgrading or updating hardware blocks, applications, and firmware recognized and selected by the user.

In operation, a user may insert the plug & play card 14 into the plug & play interface 12. The plug & play interface 12 may recognize the plug & card 14 and may transmit an instruction to display a message to the vehicle blocks 20. The message may indicate of the plug & play card 14 is recognized. The vehicle blocks 20 may display this message on a display to the user. The plug & play interface 12 may also transmit an instruction to display a message prompting the user to select blocks and applications to upgrade or update based on the vehicle block's configuration. Alternatively, the plug & play interface 12 may automatically select blocks and applications to upgrade based on the setting the user has selected for their vehicle cockpit, and based on the vehicle block's configuration or state. The plug & play interface 12 may upgrade or upload a set of instructions indicative of upgrading selected blocks and applications based on the vehicle block's 20 configuration or state. In other words, the plug & play interface 12 is backwards compatible and may upgrade firmware based on the hardware/firmware's configuration. The plug and play interface 12 may then transmit instruction to display a message for notifying the user of the blocks and applications affected by the updates and a message for notifying the user of available and may recommend relevant applications for download or purchase. The instructions may be transmitted wireless through firmware over-the-air to the vehicle blocks 20.

Additionally, the upgradable firmware system 10 may be configured to interact with and update any block or hardware found within the vehicle cockpit block 16 including the graphic processing unit (GPU), central processing unit, entertainment module, global position system module, and the like.

Figure 2:
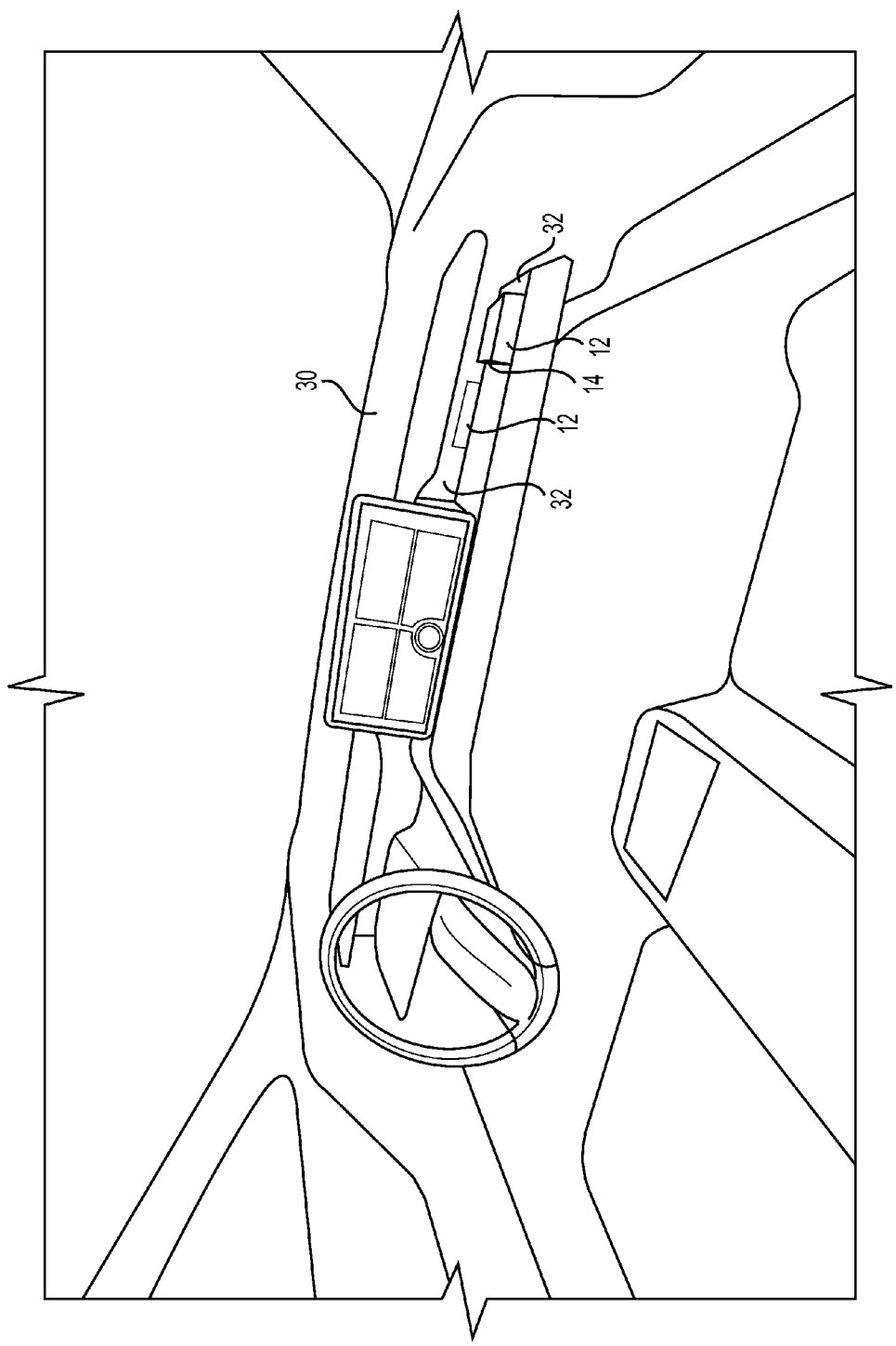
FIG. 2 is an illustration of a vehicle cockpit with a plug & play block in accordance with an aspect of the present disclosure.

Referring to FIG. 2, an illustration of a vehicle cockpit 30 with a plug & play interface 12 in accordance with an aspect of the present disclosure is shown. In particular, the plug & play interface 12 may be disposed in a front portion 32 of the vehicle cockpit 30 to allow a user to access the plug & play interface 12 easily and to allow the user to install the play & play card 14 without dealer assistance. The vehicle cockpit block (not shown) may be disposed within the vehicle cockpit 30. The plug & play interface 12 may be a docking station or drawer within the vehicle cockpit 30. Additionally, the plug & play interface 12 may be designed to slide in and out of the vehicle cockpit 30 to be open and close. The plug & play interface 12 may be flush with the front portion 32 of the vehicle cockpit 30 when closed.

Figure 3:
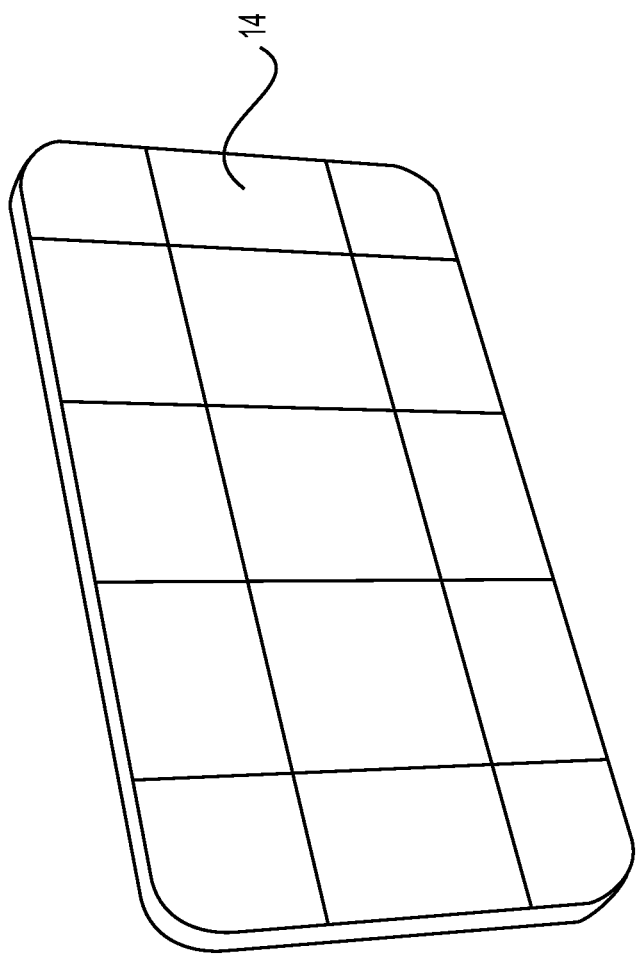
FIG. 3 is an illustration of an example of a plug & play chip in accordance with an aspect of the present disclosure.

FIG. 3 is an illustration of an example of a plug & play card 14 in accordance with an aspect of the present disclosure. The plug & play card 14 may have a rectangular-like shape. As described in FIG. 1, the plug & play card 14 may be a card, a Universal Serial Bus (USB) device, a chip, or any device designed to store a non-volatile memory configured to perform a task such as, updating one or more hardware and firmware blocks. The plug & play card 14 may be any shape or size that is conducive to storing the non-volatile memory and conducive for inserting the plug & play card 14 into the plug & play interface 12 slot. The plug & play card 14 may be a memory expansion card, a connectivity card, a graphics card, or any type of card that improves the operation or enhances the functionality of the vehicle cockpit block 16.

Figure 4:
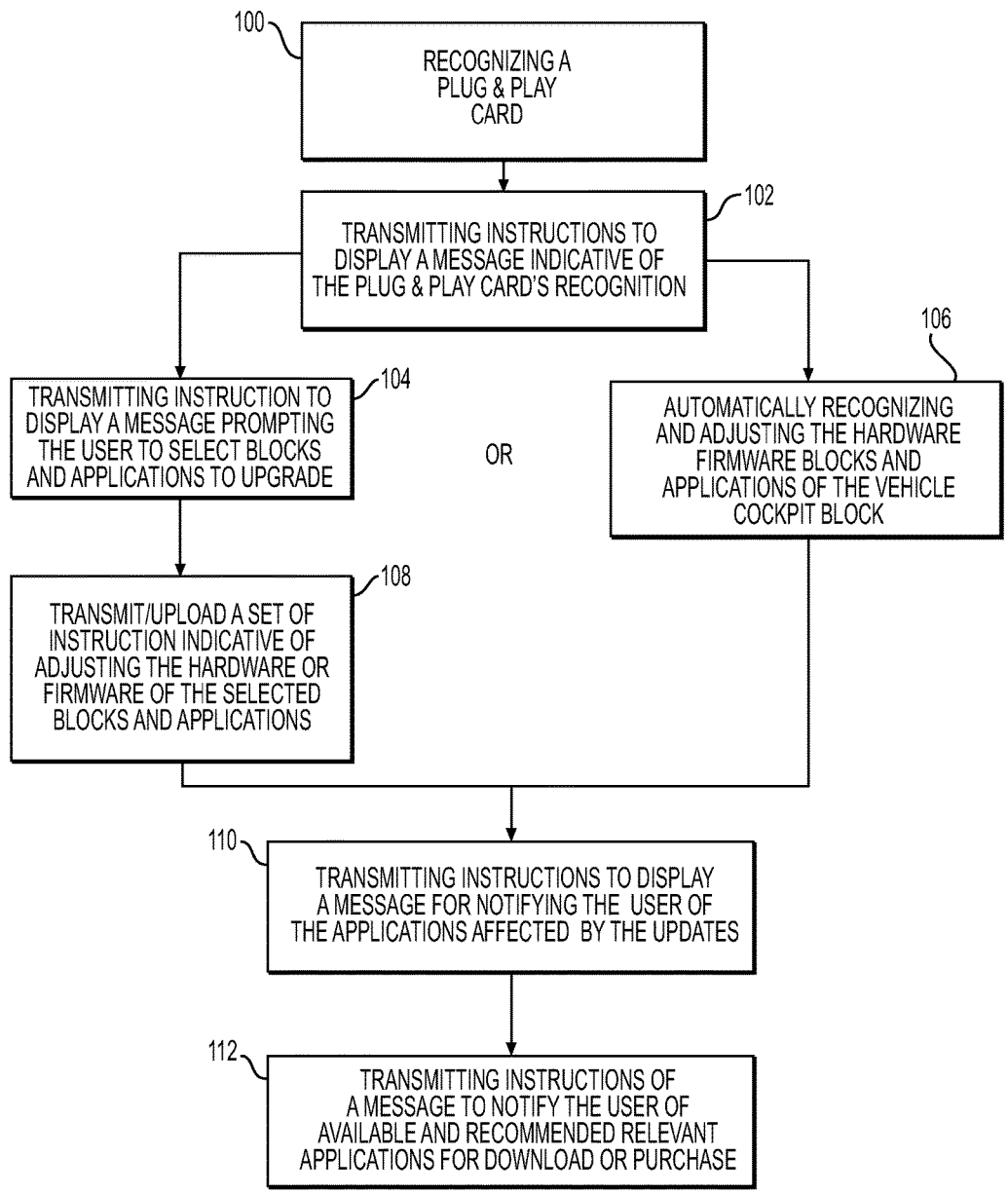
FIG. 4 is a flowchart of a method of adjusting or upgrading firmware through an upgradable firmware system in accordance with an aspect of the present disclosure.

FIG. 4 is a flowchart of a method of upgrading firmware through an upgradable firmware system in accordance with an aspect of the present disclosure. The upgradable firmware system may include a plug & play interface and a plug & play card. The method may include recognizing a play & play card configured to be inserted into the plug & play interface by a user 100. Once the plug & play card is recognized 100, the plug & play interface may transmit instructions to display a message indicating the plug & play card is recognized.

The method may also include transmitting instructions to display a message prompting the user to select a block and application to upgrade or update 104. Alternatively, the method may include automatically recognizing and adjusting the hardware and firmware blocks and applications of the vehicle cockpit block based on the current hardware and firmware blocks and applications installed 106. The adjustment may occur wirelessly over-the-air. If the message is prompted to the user 104, then the plug & play interface may upload a set of instruction indicative of adjusting the hardware or firmware of the selected blocks and applications 108. Once the plug & play interface has adjusted the hardware or firmware of the selected blocks and application 106, 108, the plug and play interface may transmit instructions to display a message for notifying the user of the applications affected by the updates 110, and a message for notifying the user of available and recommended relevant applications for download or purchase 112.

Figure 5A:
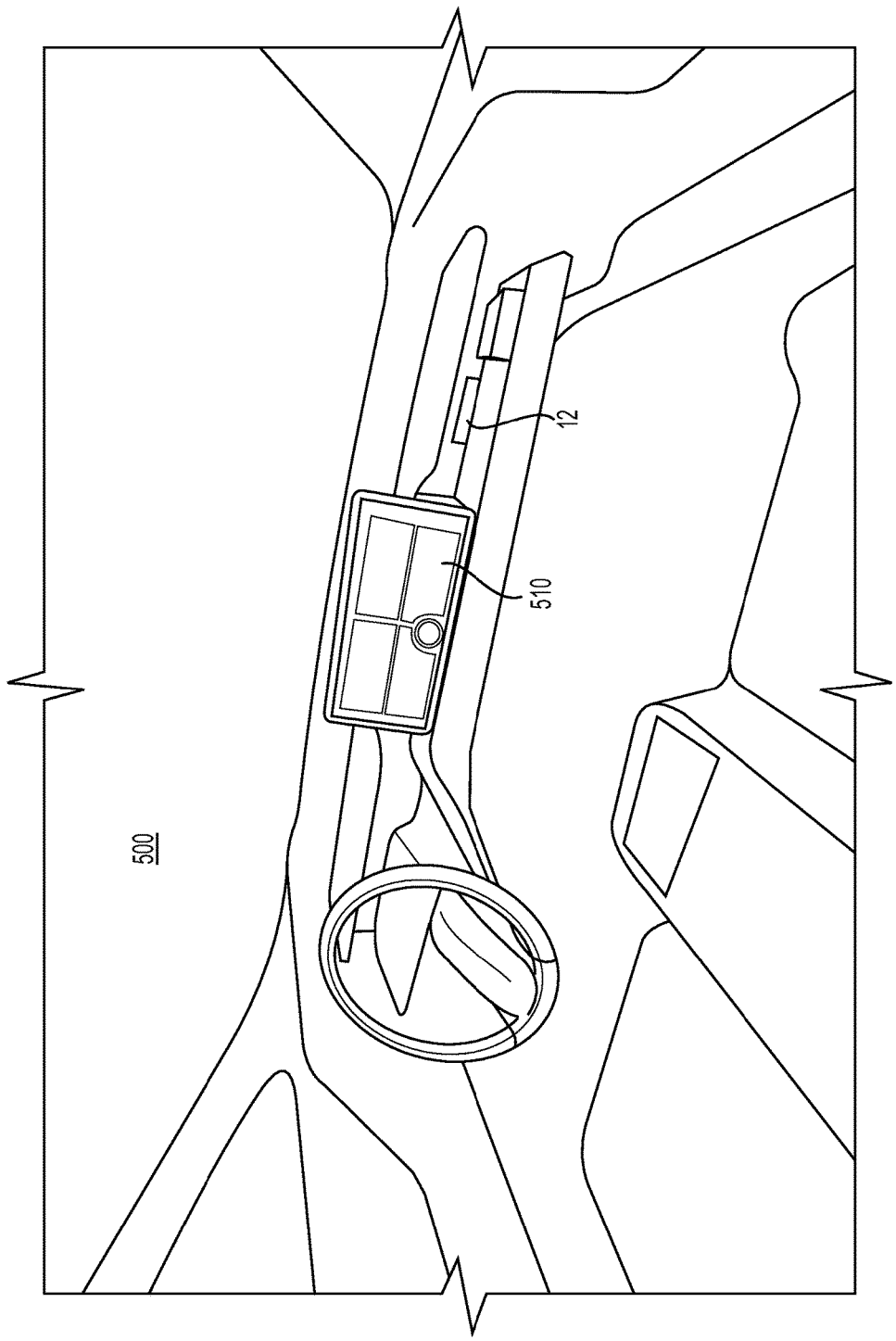
FIGS. 5(a)-(c) illustrate an example implementation of the system of FIG. 1.
Figure 5B:
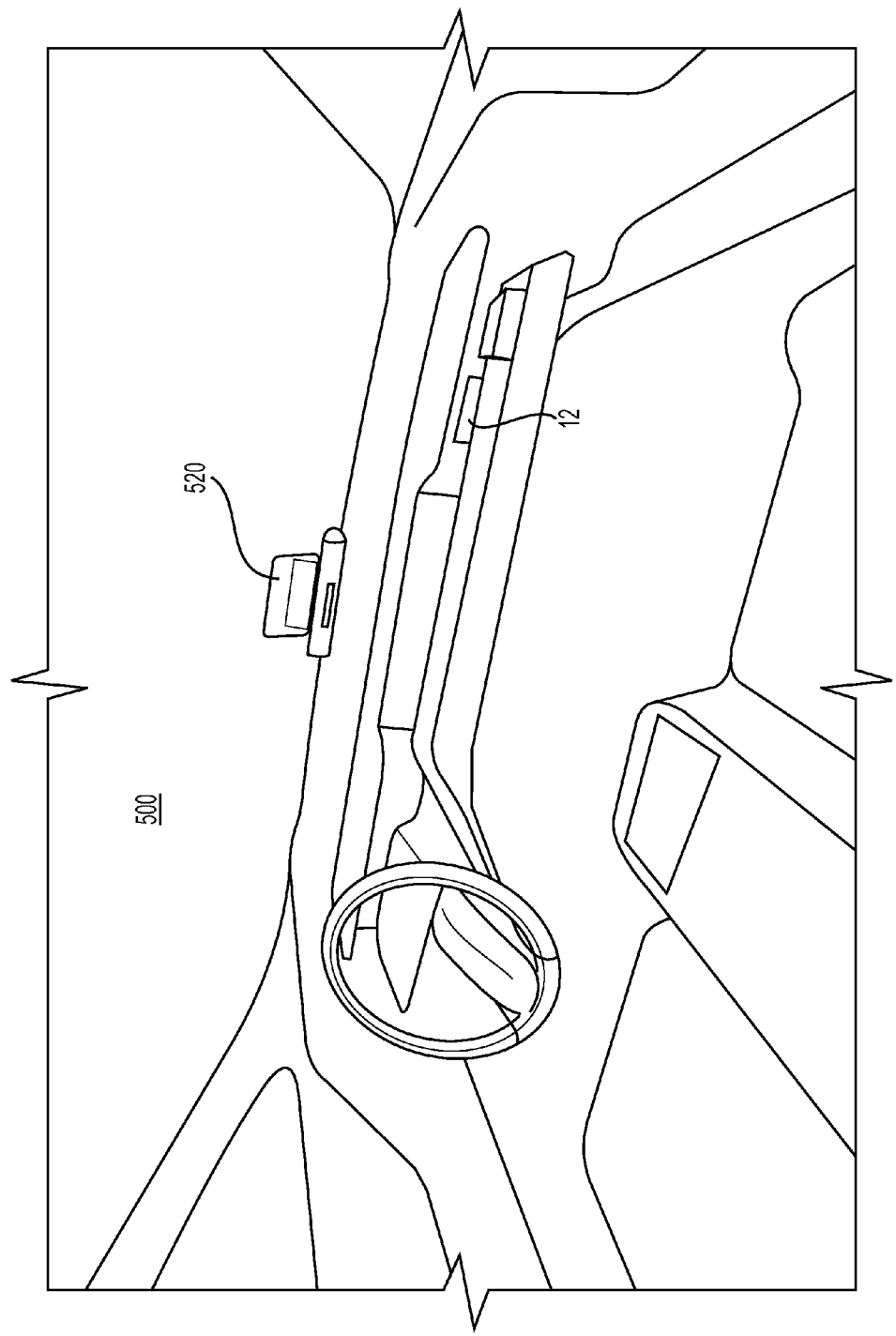
Figure 5C:
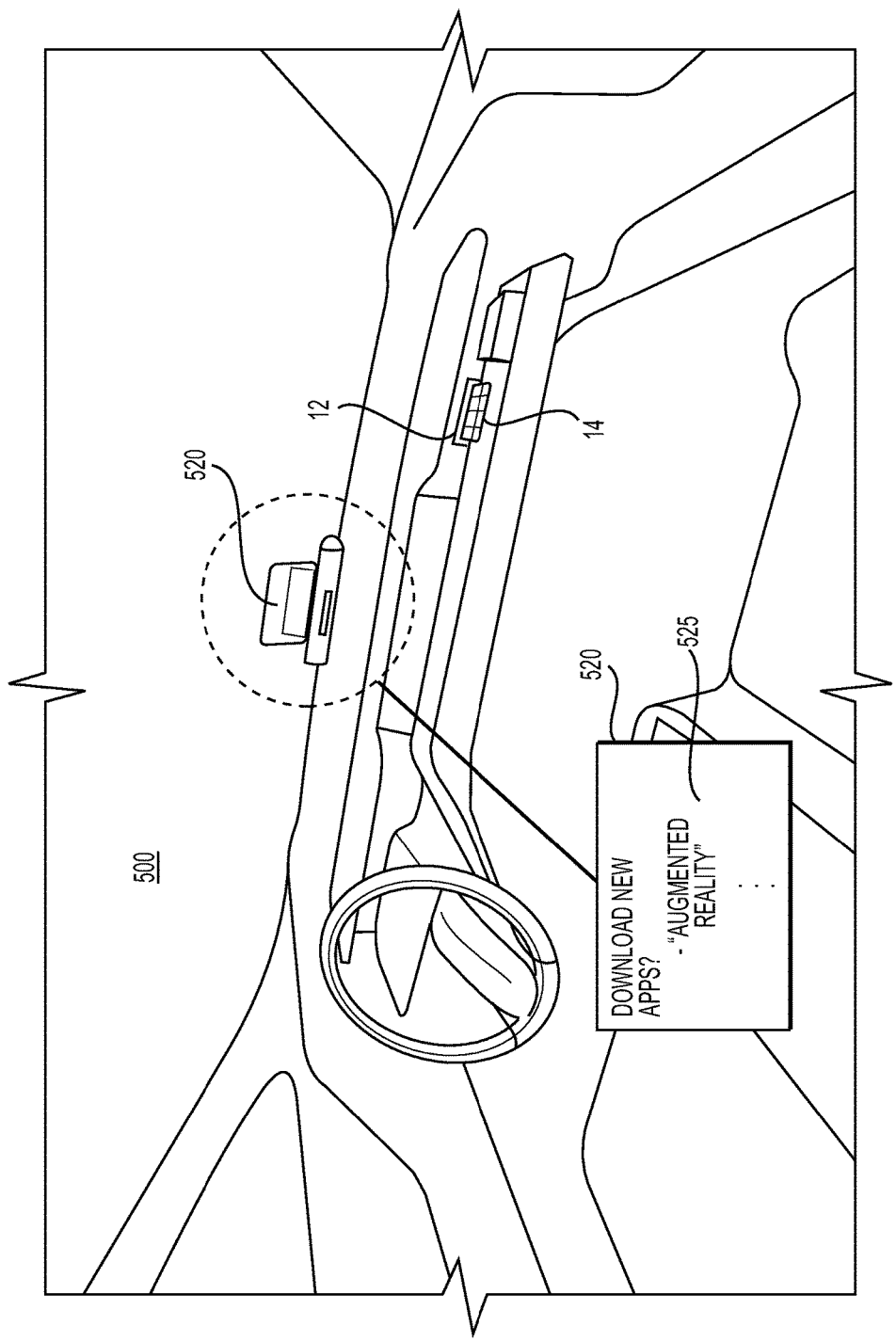

FIGS. 5(*a*)-(*c*) illustrate an example implementation of the firmware system shown in FIG. 1. The new component being installed is a heads-up display (HUD) 520. As shown in the transition of FIGS. 5(*a*) to 5(*b*), and ultimately 5(*c*)—a dashboard display 510 is replaced by a HUD 520. The owner/operator of the vehicle 500 may perform the installation by themselves, and employ the plug & play card 14 to facilitate the necessary modifications to the vehicle's electronic systems.

In FIG. 5(*b*), after the displays are configured so that the HUD 520 is now the main display, a user may insert a plug & play card 14 (i.e. electronic media). In FIG. 5(*c*), the plug & play card 14 may be used to update the vehicle's firmware, such as the examples explained in FIG. 4.

In the example shown in FIG. 5(*c*), the new display (which is blown out and shown in detail) displays a graphical user interface (GUI) window 525. The GUI window 525 presents applications that may be used or purchased with the newly installed component (the HUD 520).

Not shown or depicted is that the insertion of the plug & play card 14 (as done in FIG. 5(*c*)) may also instigate an automatic updating of the vehicle 500 to install and work properly with the newly added device.

It is appreciated by one skilled in the art that the upgradable firmware system is not limited to only vehicles and may be employed by other electronics with hardware and firmware.

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 6 and 7. The disclosed devices, components, and systems contemplate using or implementing any suitable technique for performing the steps illustrated in these figures. Thus, FIGS. 6 and 7 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A system for upgrading firmware of a vehicle, comprising:
    an electronic port configured to receive an electronic portable media, the electronic portable media configured to provide instructions of an upgradeable portion of a vehicle, the electronic port being defined as an opening installed in the vehicle's dashboard area, and configured to receive the electronic portable media through physical insertion;
    a plug and play interface configured to electronically communicate the instructions to instructions to a vehicle cockpit block,
    wherein in response to the electronic portable media being inserted into the electronic port and a new component of the vehicle is installed, an action associated with the upgrading of the firmware is performed,
    the opening being disposed on a dashboard area independent from another visible component of the vehicle the new component is defined as a replacement part of a previously installed component, and
    the new component is provided in a physical different location from the previously installed component,
    the action being defined as an access of an application storage source for new applications associated with the new component.

2. The system according to claim 1, wherein the action is defined as automatically recognizing the new component, and adjusting the firmware of the vehicle with a predefined set of applications for the new component.

3. The system according to claim 1, wherein the action is defined as transmitting a message prompting a selection of whether to install the new component.

4. The system according to claim 1, wherein the action is defined as transmitting a message prompting a selection of whether to install a predefined set of applications associated with the new component.

5. The system according to claim 4, wherein the predefined set of applications are sourced from a network connected source.

6. An electronic card, comprising:
    an interface electronic component configured to transmit instructions electronically to an electronic port of a vehicle; and
    non-volatile memory configured to store the instructions to be transmitted,
    wherein the instructions including actions to upgrade the vehicle's firmware in response to a new component being installed on the vehicle,
    the electronic card being a physical object insert-able into an electronic port, the electronic port being defined as an opening provided with the vehicle's dashboard,
    the opening being disposed on a dashboard area independent from another visible component of the vehicle the new component is installed on the vehicle,
    the new component is defined as a replacement part of a previously installed component, and
    the new component is provided in a physical different location from the previously installed component,
    the action being defined as an access of an application storage source for new applications associated with the new component.

7. The electronic card according to claim 6, wherein the action is defined as automatically recognizing the new component, and adjusting the firmware of the vehicle with a predefined set of applications for the new component.

8. The electronic card according to claim 6, wherein the action is defined as transmitting a message prompting a selection of whether to install the new component.

9. The electronic card according to claim 6, wherein the action is defined as transmitting a message prompting a selection of whether to install a predefined set of applications associated with the new component.

10. The electronic card according to claim 6, wherein the predefined set of applications are sourced from a network connected source.

11. The electronic card according to claim 6, wherein the electronic card is physically inserted by an occupant of the vehicle to make electrical contact with the electronic port.

12. The system according to claim 1, further comprising a covering to physically open/close to display/hide the opening.

13. A system for upgrading firmware of a vehicle, comprising:
an electronic port configured to receive an electronic portable media, the electronic portable media configured to provide instructions of an upgradeable portion of a vehicle;
a plug and play interface configured to electronically communicate the instructions to instructions to a vehicle cockpit block,
wherein in response to the electronic portable media being inserted into the electronic port and a new component of the vehicle is installed, an action associated with the upgrading of the firmware is performed,
the new component is defined as a replacement part of a previously installed component, and
the new component is provided in a physical different location from the previously installed component,
the action being defined as an access of an application storage source for new applications associated with the new component.

14. The system according to claim 1, wherein the opening is provided independent from an audio or video head unit.

15. The system according to claim 14, wherein the opening is provided a lid, configured to be in either an open or close state.

16. The system according to claim 1, wherein the new component is a heads-up display (HUD), and an old component being replaced by the new component is a dashboard display.

17. The system according to claim 16, wherein the opening is provided separately and not attached to both the new component and the old component.

* * * * *